United States Patent
Tan et al.

(10) Patent No.: US 9,293,896 B2
(45) Date of Patent: Mar. 22, 2016

(54) ASSEMBLY FOR POWER CONNECTION AND SIGNAL ACQUISITION

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Jing Tan, Shenzhen (CN); Weixin Zheng, Shenzhen (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 396 days.

(21) Appl. No.: 13/970,919

(22) Filed: Aug. 20, 2013

(65) Prior Publication Data

US 2014/0063692 A1     Mar. 6, 2014

(30) Foreign Application Priority Data

Aug. 28, 2012  (CN) ...................... 2012 2 0429649 U

(51) Int. Cl.
   *H02B 1/01*   (2006.01)
   *H01M 2/10*   (2006.01)
   *H01M 2/20*   (2006.01)

(52) U.S. Cl.
   CPC ............... *H02B 1/01* (2013.01); *H01M 2/1061* (2013.01); *H01M 2/202* (2013.01)

(58) Field of Classification Search
   CPC ....... H02B 1/01; H01M 2/1061; H01M 2/202
   USPC .......................................... 361/741; 429/170
   See application file for complete search history.

(56) References Cited

U.S. PATENT DOCUMENTS

| 6,410,184 B1 * | 6/2002 | Horiuchi ............. B60L 11/1881 361/601 |
| 6,431,921 B2 * | 8/2002 | Saito ............................. 439/736 |
| 8,449,333 B2 * | 5/2013 | Ikeda .................. H01M 2/1061 439/627 |

(Continued)

FOREIGN PATENT DOCUMENTS

| CN | 1881654 A | 12/2006 |
| CN | 101141012 A | 3/2008 |

(Continued)

OTHER PUBLICATIONS

PCT International Search Report and Written Opinion mailed Nov. 7, 2013, issued in International Application No. PCT/CN2013/080729 (12 pages).

*Primary Examiner* — Adrian S Wilson
*Assistant Examiner* — Abhishek Rathod
(74) *Attorney, Agent, or Firm* — Finnegan, Henderson, Farabow, Garrett & Dunner, LLP

(57) ABSTRACT

An assembly for power connection and signal acquisition includes a power connection member and a patch panel. The power connection member includes a holder, a plurality of connection pieces disposed in the holder, and a protection shell mounted on the holder to protect the plurality of connection pieces. The patch panel includes a trough that defines a plurality of cable slots, a sampling cable received in each of the cable slots, and a protection cover mounted on the trough to protect the sampling cable received in the cable slot. A sampling terminal is disposed at an end of the sampling cable for electrically connecting the sampling cable with each of the connection pieces.

11 Claims, 7 Drawing Sheets

(56) References Cited

U.S. PATENT DOCUMENTS

| | | | |
|---|---|---|---|
| 2002/0102457 A1* | 8/2002 | Oogami | B60L 3/0046 429/159 |
| 2006/0091891 A1* | 5/2006 | Woo | H01M 2/206 324/430 |
| 2010/0248008 A1* | 9/2010 | Sugawara | H01M 2/1077 429/159 |
| 2011/0064986 A1* | 3/2011 | Ogasawara | H01M 2/206 429/121 |
| 2011/0064987 A1* | 3/2011 | Ogasawara | H01M 2/206 429/121 |
| 2011/0293986 A1* | 12/2011 | Kozu | H01M 2/105 429/120 |
| 2012/0115004 A1* | 5/2012 | Park | H01M 2/105 429/120 |
| 2012/0148876 A1 | 6/2012 | Zeng et al. | |
| 2012/0164509 A1* | 6/2012 | Ogasawara | H01R 9/226 429/121 |
| 2012/0171908 A1* | 7/2012 | Henmi | H01M 2/1083 439/761 |
| 2012/0328920 A1* | 12/2012 | Takase | H01M 2/1077 429/90 |
| 2014/0017540 A1* | 1/2014 | Miyawaki | H01M 2/1016 429/99 |

FOREIGN PATENT DOCUMENTS

| | | |
|---|---|---|
| CN | 101916883 A | 12/2010 |
| CN | 202259591 U | 5/2012 |
| CN | 202839812 U | 3/2013 |
| WO | WO 2014/032500 A1 | 3/2014 |

* cited by examiner

ASSEMBLY FOR POWER CONNECTION AND SIGNAL ACQUISITION

CROSS-REFERENCE TO RELATED APPLICATION

This application claims priority to, and benefits of Chinese Patent Application Serial No. 201220429649.1, filed with the State Intellectual Property Office of China on Aug. 28, 2012, the entire contents of which are incorporated herein by reference.

FIELD

Embodiments of the present disclosure relate to a power battery field, and more particularly to an assembly for power connection and signal acquisition.

BACKGROUND

A power battery in the related art often uses an integrally injection molded patch panel assembly for power connection and signal acquisition. In such batteries, cable slots are formed in the integral patch panel assembly, and both a sampling cable and a power connection cable are disposed in slots. The integral patch panel assembly typically has a complex structure and a poor connection reliability. Furthermore, the replacement and maintenance of the components in the patch panel assembly are difficult.

SUMMARY

Embodiments of the present disclosure seek to solve at least one of the problems existing in the related art to at least some extent, more particularly to solve the problems of complex structure of the integral patch panel assembly and inconvenient replacement and maintenance of components in the integral patch panel assembly.

Accordingly, embodiments of the present disclosure provide an assembly for power connection and signal acquisition, comprising a power connection member and a patch panel. The power connection member comprises a holder, a plurality of connection pieces disposed in the holder and a protection shell mounted on the holder to protect the plurality of connection pieces. The patch panel comprises a trough defining a plurality of cable slots, a sampling cable received in each of the cable slots, and a protection cover mounted on the trough to protect the sampling cable received in the cable slot. A sampling terminal is disposed at an end of the sampling cable for electrically connecting the sampling cable with each of the connection pieces.

In some embodiments, the holder defines a plurality of mounting regions. The connection pieces are mounted in the mounting regions respectively, and each of the mounting regions is defined by a bottom plate and a side plate disposed at a periphery of the bottom plate. An outer surface of the bottom plate of each mounting region is adapted to mount a battery, and the bottom plate is configured to support the connection piece. The side plate is configured to clamp the connection piece in a lateral direction.

The side plate may be provided with a clamping tongue configured to clamp the connection piece, a boss configured to secure the protection shell, and a notch for passing the sampling terminal. In some embodiments, adjacent mounting regions are connected via a first flexible connection.

In some embodiments, the protection shell defines a plurality of piece-covering regions configured to cover the connection pieces respectively, wherein adjacent covering regions are connected via a second flexible connection. The protection shell is formed with a recess for securing the protecting shell to the holder. Each of the connection pieces is formed with a first positioning hole to mount the battery and a second positioning hole to mount the sampling terminal.

In some embodiments, the trough is further provided with a protrusion configured to fix the sampling cable, the trough is connected with the protection cover via a snap structure, and the protection cover is formed with a channel corresponding to each of the cable slots. Each of the cable slots is filled with a transparent pouring sealant. The sampling terminals are disposed at a side of the trough, and the number of the sampling terminals is equal to that of the connection pieces. According to some embodiments, each of the sampling terminals is formed with a third positioning hole configured to fix the sampling terminal with the connection piece.

The trough may define a plurality of cable receiving regions, the cable slots in each of the cable receiving regions receive a plurality of sampling cables, and adjacent cable receiving regions are connected via a third flexible connection. In some embodiments, a shape of the protection cover matches with that of the trough, the protection cover defines a plurality of cable-covering regions to cover the sampling cables, and adjacent cable-covering regions are connected via a fourth flexible connection.

According to embodiments of the present disclosure, by detachably connecting the power connection member with the patch panel, the internal components in the assembly are easy to replace and maintain. Moreover, the assembly according to embodiments of the present disclosure has a compact structure and a high space utilization rate, which may improve production efficiency and arrange cables automatically.

Figure 1:
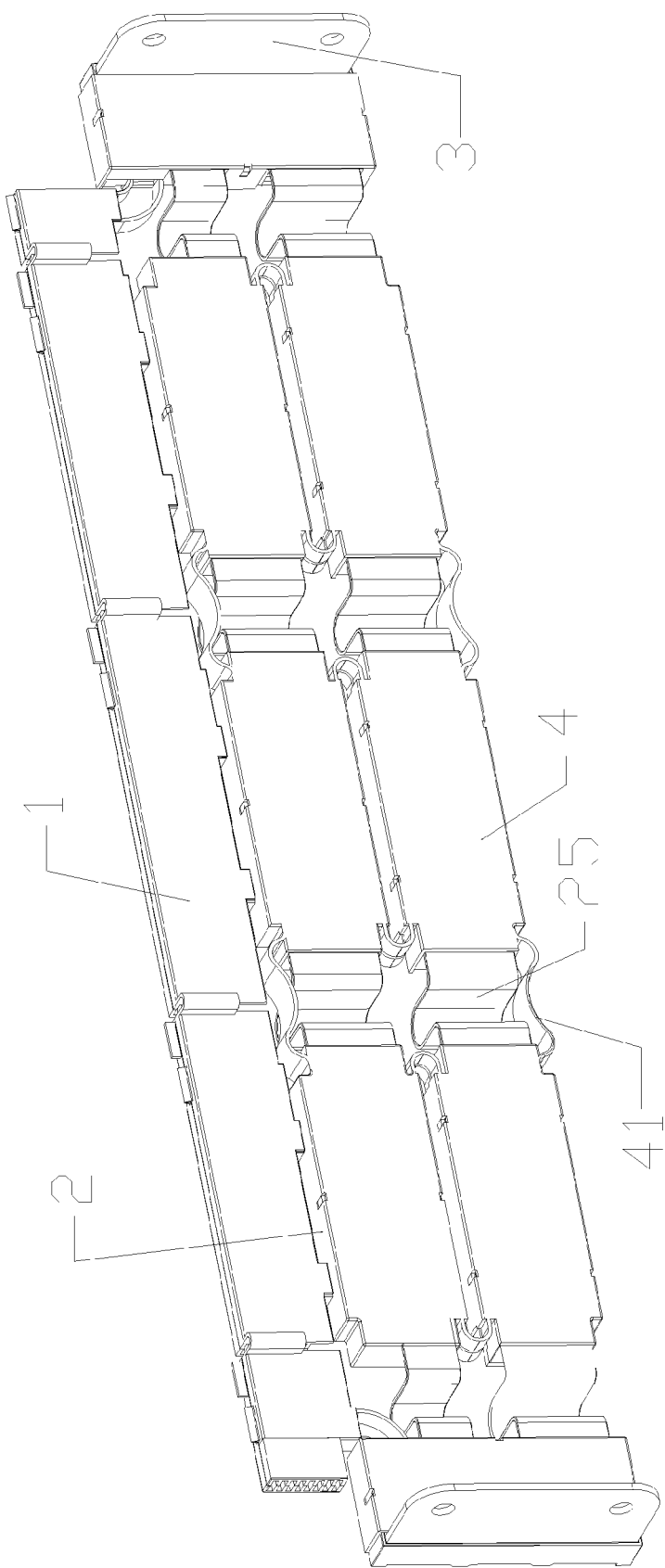
FIG. 1 is a schematic view of an assembly for power connection and signal acquisition according to an embodiment of the present disclosure.

PARTS LIST 1 patch panel
2 holder
3 connection piece 4 protection shell
5 battery
10 sampling cable
11 snap groove
12 snap tongue
13 protrusion
14 sampling terminal
15 trough
151 cable slot
152 cable receiving region
16 third positioning hole
17 channel
18 protection cover
181 cable-covering region
19 third flexible connection
20 fourth flexible connection
21 inclined clamping tongue
22 bottom plate
23 side plate
24 notch
25 first flexible connection
26 boss
28 mounting region
31 first positioning hole
32 second positioning hole
41 second flexible connection
42 recess
43 piece-covering region

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar members and the members having same or similar functions are denoted by like reference numerals throughout the descriptions.

FIG. 1 is a schematic view of an assembly for power connection and signal acquisition according to embodiments of the present disclosure.

As shown in FIGS. 1-8, the assembly comprises a power connection member and a patch panel 1, and the patch panel 1 is disposed on a side of the power connection member. The power connection member comprises a holder 2, a protection shell 4 and a plurality of connection pieces 3. The plurality of connection pieces 3 are disposed in the holder 2, and the protection shell 4 is mounted onto the holder 2 to cover and protect the plurality of connection pieces 3.

Figure 5:
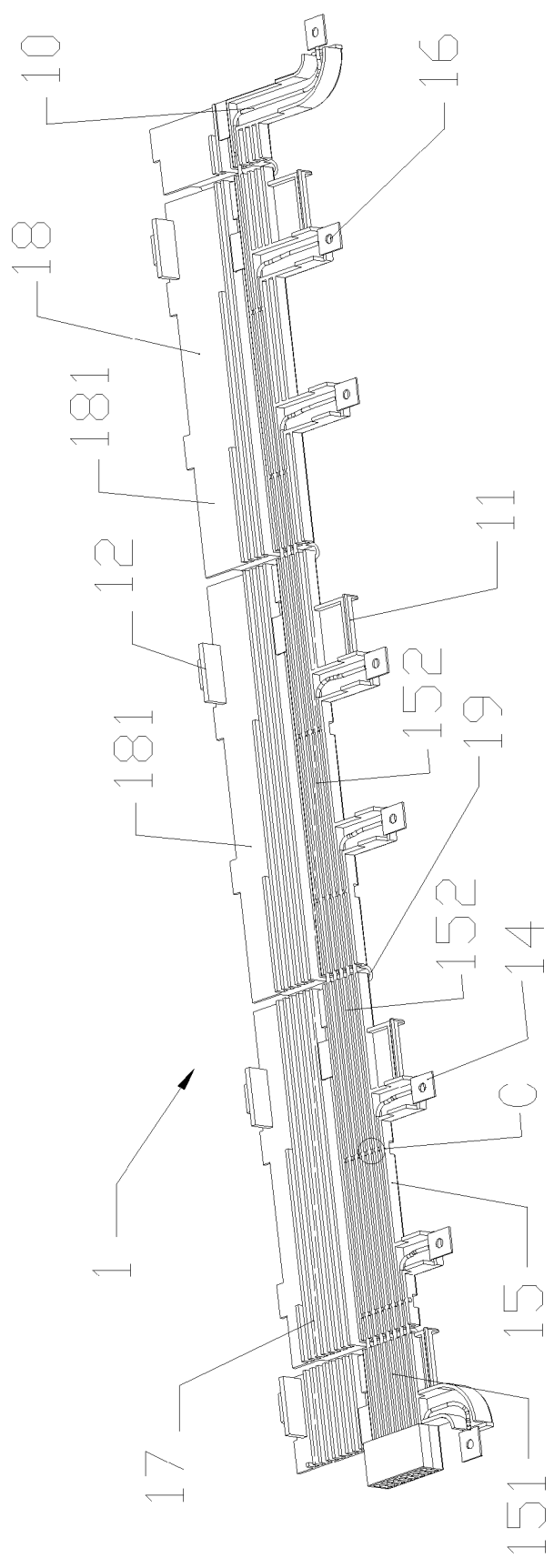
FIG. 5 is a schematic view showing a patch panel of an assembly for power connection and signal acquisition according to an embodiment of the present disclosure when a protection cover of the patch panel is open.

The patch panel 1 comprises a trough 15, a protection cover 18 and a sampling cable 10. The trough 15 has a plurality of cable slots 151 formed therein, as shown in FIG. 5. The sampling cable 10 is received in each cable slot 151, and a sampling terminal 14 is disposed at an end of the sampling cable 10 for electrically connecting the sampling cable 10 with each of the connection pieces 3. The protection cover 18 is mounted onto the trough 15 to cover and protect the sampling cable 10 received in the cable slot 151.

Figure 2:
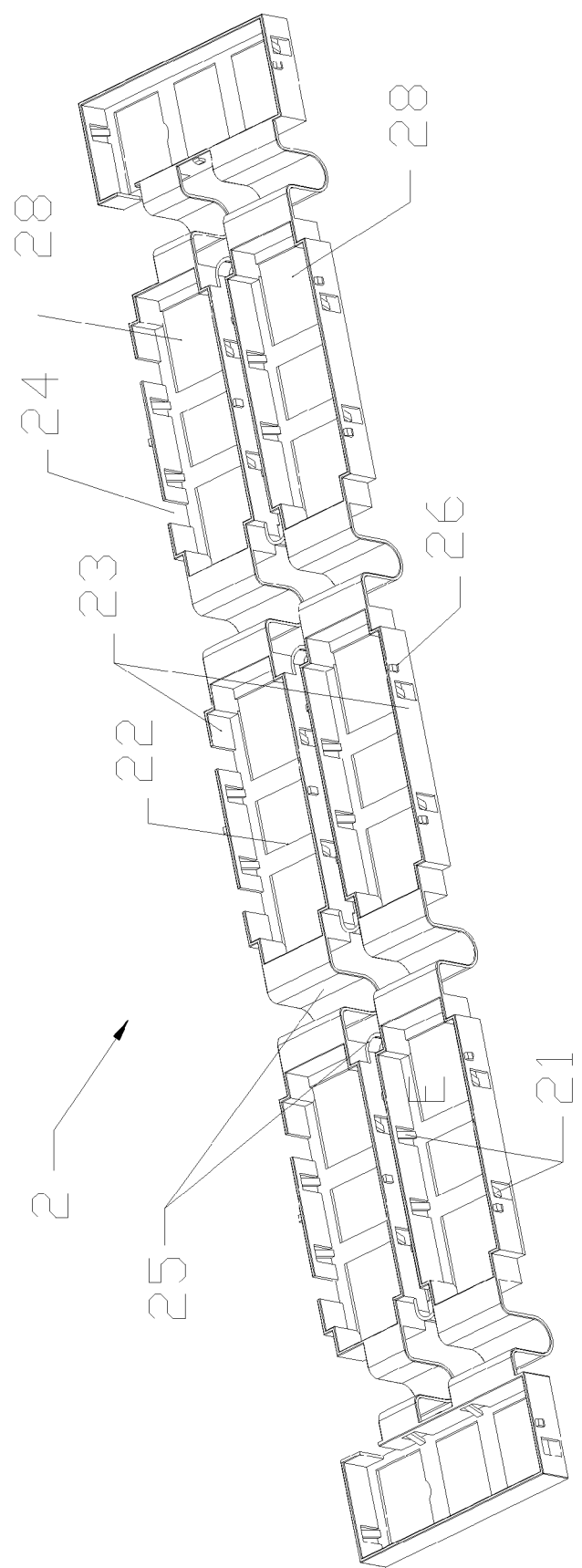
FIG. 2 is a schematic view of a holder of an assembly for power connection and signal acquisition according to an embodiment of the present disclosure.

In some embodiments of the present disclosure, the holder 2 may be made of a material such as polypropylene (PP), polyethylene (PE), acrylonitrile butadiene styrene copolymers (ABS), or a combination thereof. Preferably, the holder may be made of PP and PE. The holder 2 defines a plurality of mounting regions 28 therein, such as 8 mounting regions 28 as shown in FIG. 2. However, the present disclosure is not limited to this. The connection pieces 3 are mounted in the mounting regions respectively. Each mounting region 28 is defined by a bottom plate 22 and a side plate 23 disposed at and along a periphery of the bottom plate 22. An outer surface of the bottom plate 22 of each mounting region 28 is adapted to mount a battery 5 (see FIG. 5), the bottom plate 22 is configured to support the connection piece 3, and the side plate 23 is configured to clamp and secure each connection piece 3 in a lateral direction.

As shown in FIG. 2, the side plate 23 is formed with a clamping tongue 21 configured to clamp and secure the connection piece 3 in the mounting region 28. Specifically, the clamping tongue 21 is configured to fix the connection piece 3 from the above of the connection piece 3, so as to prevent the connection piece 3 from escaping from the mounting region 28 of the holder 2. In some embodiments of the present disclosure, the clamping tongue 21 is inclined relative to the side plate 23, as shown in FIG. 2. Preferably, an angle between the inclined clamping tongue 21 and the side plate 23 ranges from 10° to 30°. Most preferably, the angle between the inclined clamping tongue 21 and the side plate 23 is 20°.

The side plate 23 is further provided with a boss 26 configured to fit with the protection shell 4 so as to secure the protection shell 4 to the holder 2, as shown in FIG. 2. Accordingly, the protection shell 4 is formed with a recess 42 to be engaged with the boss 26. The boss 26 is engaged into the recess 42 of the protection shell 4, and thus the holder 2 is securely connected with the protection shell 4.

The side plate 23 is further formed with a notch 24 through which the sampling terminal 14 passes. By providing the notch 24, it is possible to connect the patch panel 1 with the power connection member conveniently.

Figure 4:
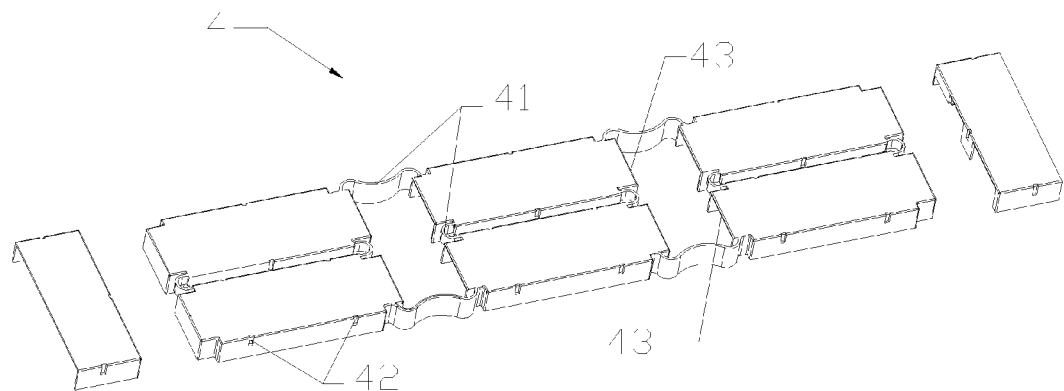
FIG. 4 is a schematic view of a protection shell of an assembly for power connection and signal acquisition according to an embodiment of the present disclosure.

As shown in FIG. 2, adjacent mounting regions 28 in the holder 2 are connected via a first flexible connection 25. A shape of the protection shell 4 matches with that of the holder 2, so that the protection shell 4 defines a plurality of piece-covering regions 43 corresponding to the mounting regions 28 respectively. Each piece-covering region 43 is configured to cover a corresponding connection piece 3, and adjacent piece-covering regions 43 are connected via a second flexible connection 41, as shown in FIG. 4. By disposing the first flexible connection 25 and the second flexible connection 41, a disadvantageous effect due to tolerance during the assembling process is eliminated.

Figure 3:
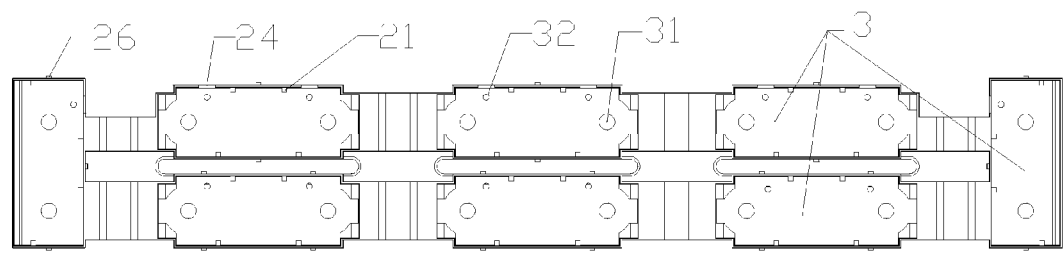
FIG. 3 is a schematic view of a holder and a connection piece of an assembly for power connection and signal acquisition according to an embodiment of the present disclosure.

As shown in FIG. 3, each connection piece 3 is formed with a first positioning hole 31 configured to mount the battery 5. Thus, the number of the connection pieces 3 matches with that of the batteries 5. A leading-out pole of the battery 5 is fitted with the first positioning hole 31, and then the leading-out pole of the battery 5 may be connected with the connection piece 3 by bolting or welding.

Figure 7:
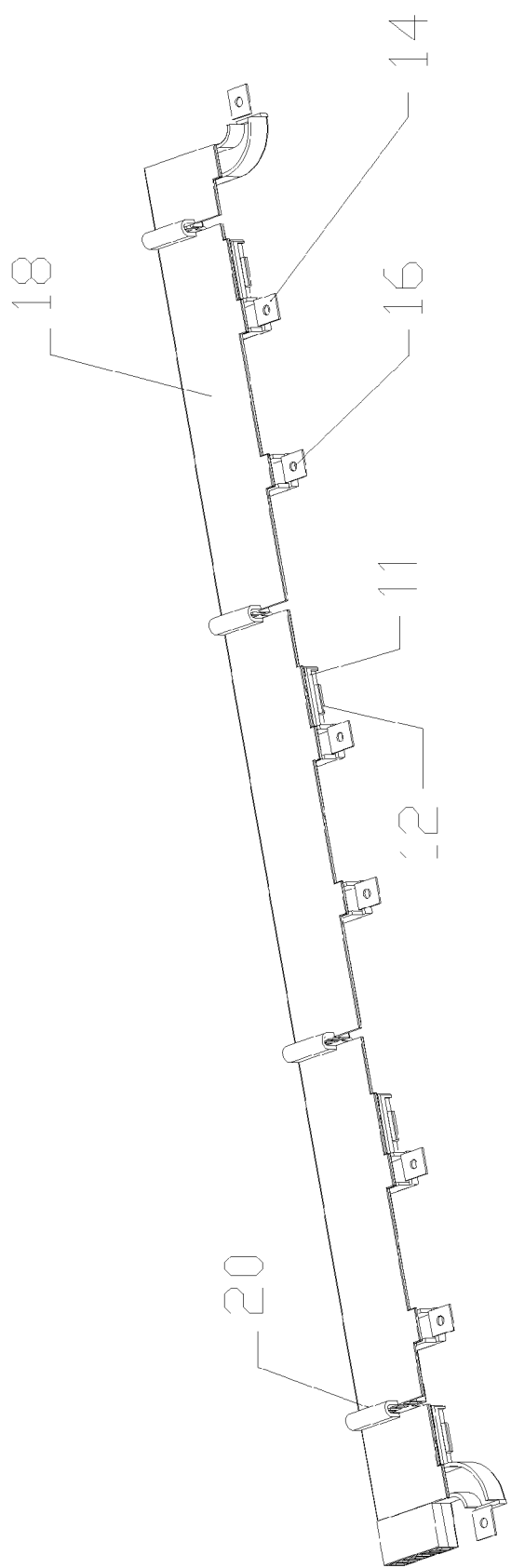
FIG. 7 is a schematic view showing a patch panel of an assembly for power connection and signal acquisition according to an embodiment of the present disclosure when a protection cover of the patch panel is closed.

As shown in FIG. 3, the connection piece 3 is further formed with a second positioning hole 32 configured to mount the sampling terminal 14. In some embodiments of the present disclosure, the connection piece 3 is further connected with the sampling cable 10 via the sampling terminal 14. Accordingly, as shown in FIG. 5 and FIG. 7, each sampling terminal 14 is formed with a third positioning hole 16 configured to connect the sampling terminal 14 with the connection piece 3. The position of the third positioning hole 16 is corresponding to the position of the second positioning hole 32. Thus, on one hand, the sampling terminal 14 may be positioned, and on the other hand, a reliable connection between the sampling terminal 14 and the connection piece 3 is realized by screwing, welding or riveting between the second positioning hole 32 and the third positioning hole 16. In one embodiment of the present disclosure, the sampling terminal 14 is preferably connected with the connection piece 3 by riveting and welding.

Figure 6:
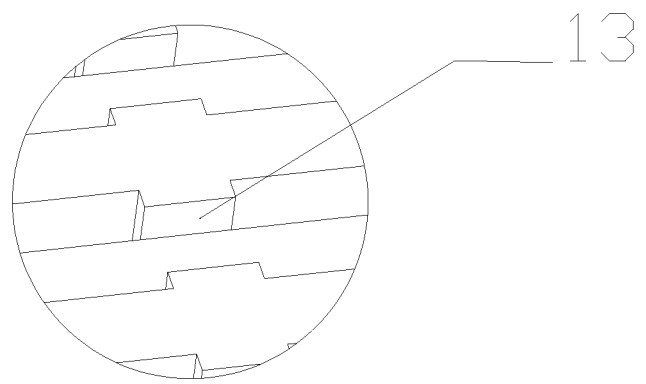
FIG. 6 is an enlarged view of a part C shown in FIG. 5.

The trough 15 is further provided with a protrusion 13 configured to secure the sampling cable 10, as shown in FIG. 6. In some embodiments of the present disclosure, the sampling cable 10 may also be secured under the assistance of other means, such as dispensing reinforcement or glue sealing. Preferably, each cable slot 151 is filled with a transparent pouring sealant (not shown), which may further facilitate the protection and the fault examination of the sampling cable 10.

In one embodiment of the present disclosure, the trough 15 is connected with the protection cover 18 via a snap structure, thus realizing the opening or closing of the protection cover 18 and facilitating the fault examination of the sampling cable 10. Specifically, the trough 15 is formed with a snap groove 11, the protection cover 18 is correspondingly provided with a snap tongue 12, and the protection cover 18 is connected with the trough 15 in a flipping manner. When the protection cover 18 is closed, the snap tongue 12 is fitted into the snap groove 11. In this way, the protection cover 18 is securely connected with the trough 15.

As shown in FIG. 5, the protection cover 18 is formed with a channel 17 corresponding to each cable slot 151. The channel 17 and the cable slot 151 define a receiving space of the sampling cable 10. As shown in FIG. 5 and FIG. 7, the sampling terminal 14 is disposed at a side of the trough 15, and the sampling terminal 14 is electrically connected with the sampling cable 10 received in the cable slot 151. The number of the sampling terminals 14 matches with that of the connection pieces 10. For example, the number of the sampling terminals 14 is equal to that of the connection pieces 10.

As shown in FIG. 5, the trough 15 comprises a plurality of cable receiving regions 152. The cable slots 151 in each cable receiving region 152 receive a plurality of sampling cables 10, and a plurality of sampling terminals 14 of the sampling cables 10 are extended out of the cable slots 151. Adjacent cable receiving regions 152 are connected via a third flexible connection 19.

As shown in FIG. 7, a shape of the protection cover 18 matches with the shape of the trough 15. The protection cover 18 comprises a plurality of cable-covering regions 181 corresponding to the cable receiving regions 152 respectively. The cable-covering regions 181 are used to cover the sampling cables 10. Adjacent cable-covering regions 181 are connected via a fourth flexible connection 20.

Figure 8:
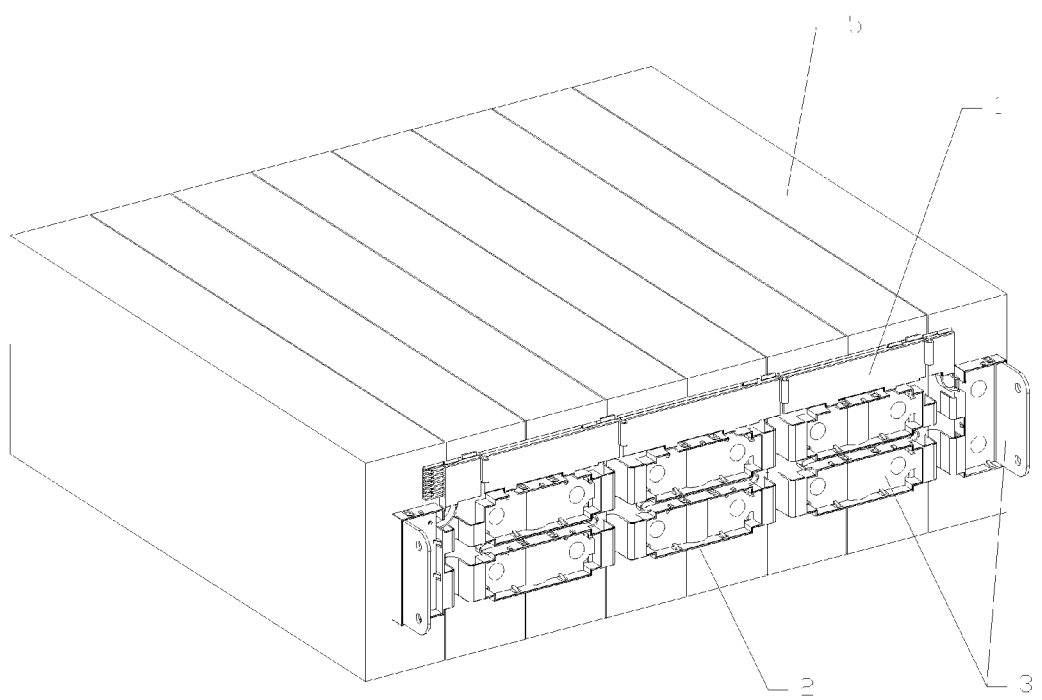
FIG. 8 is a schematic view of an assembly for power connection and signal acquisition according to an embodiment of the present disclosure in a usage state.

When the assembly according to embodiments of the present disclosure is used, the protection shell 4 is firstly taken off, and then the battery 5 is assembled to the bottom of the holder 2. Next, the leading-out pole of the battery 5 is passed through the bottom plate 22 to be fixed with the first positioning hole 31 of the connection piece 3, for example, by means of screwing or welding, preferably, by means of screwing. Thus, the structure shown in FIG. 8 is obtained. Finally, the protection shell 4 is mounted onto the holder 2. Thus, the power connection is realized with the connection of the other end of the battery 5, so that it is possible to execute the subsequent signal acquisition operation.

According to embodiments of the present disclosure, by detachably connecting the power connection member with the patch panel, the internal components in the assembly are easy to replace and maintain. Moreover, the assembly according to embodiments of the present disclosure has a compact structure and a high space utilization rate, which may improve a production efficiency and arrange cables automatically.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. An assembly for power connection and signal acquisition, comprising:
    a power connection member comprising a holder, a plurality of connection pieces disposed in the holder and a protection shell mounted on the holder to protect the plurality of connection pieces;
    a patch panel comprising:
        a trough defining a plurality of cable slots;
        a sampling cable received in each of the cable slots, wherein a sampling terminal is disposed at an end of the sampling cable for electrically connecting the sampling cable with each of the connection pieces; and
        a protection cover mounted on the trough to protect the sampling cable received in the cable slot;
    wherein the holder defines a plurality of mounting regions, the connection pieces are mounted in the mounting regions respectively, each of the mounting regions is defined by a bottom plate and a side plate disposed at a periphery of the bottom plate, and
    wherein an outer surface of the bottom plate of each mounting region is configured to mount a battery, the bottom plate is configured to support the connection piece, and the side plate is configured to clamp the connection piece in a lateral direction;
    wherein the side plate includes a clamping tongue configured to clamp the connection piece, a boss configured to secure the protection shell, and a notch for receiving the sampling terminal.

2. The assembly according to claim 1, wherein adjacent mounting regions are connected via a first flexible connection.

3. The assembly according to claim 1, wherein the protection shell defines a plurality of piece-covering regions configured to cover the connection pieces respectively, and wherein adjacent piece-covering regions are connected via a second flexible connection.

4. The assembly according to claim 1, wherein the protection shell is formed with a recess for securing the protecting shell to the holder.

5. The assembly according to claim 1, wherein each of the connection pieces is formed with a first positioning hole to mount the battery and a second positioning hole to mount the sampling terminal.

6. The assembly according to claim 1, wherein the trough is further provided with a protrusion configured to fix the sampling cable, the trough is connected with the protection cover via a snap structure, and the protection cover is formed with a channel corresponding to each of the cable slots.

7. The assembly according to claim 1, wherein each of the cable slots is filled with a transparent pouring sealant.

8. The assembly according to claim 1, wherein the sampling terminals are disposed at a side of the trough, and the number of the sampling terminals is equal to that of the connection pieces.

9. The assembly according to claim 1, wherein each of the sampling terminals is formed with a third positioning hole configured to fix the sampling terminal with the connection piece.

10. The assembly according to claim 1, wherein the trough defines a plurality of cable receiving regions, the cable slots in each of the cable receiving regions receive a plurality of sampling cables, and adjacent cable receiving regions are connected via a third flexible connection.

11. The assembly according to claim 1, wherein a shape of the protection cover matches with that of the trough, the protection cover defines a plurality of cable-covering regions to cover the sampling cables, and adjacent cable-covering regions are connected via a fourth flexible connection.

* * * * *